United States Patent [19]

Sato et al.

[11] Patent Number: 4,826,472

[45] Date of Patent: May 2, 1989

[54] TOOTHED BELT

[75] Inventors: Akihiro Sato; Mitsuho Yamada, both of Settsu; Shigehiro Isshiki, Nara, all of Japan

[73] Assignee: Ashimori Kogyo Kabushiki Kaisha, Osaka, Japan

[21] Appl. No.: 167,856

[22] PCT Filed: Jun. 19, 1987

[86] PCT No.: PCT/JP87/00405
§ 371 Date: Feb. 19, 1988
§ 102(e) Date: Feb. 19, 1988

[87] PCT Pub. No.: WO87/07931
PCT Pub. Date: Dec. 30, 1987

[30] Foreign Application Priority Data

Jun. 19, 1986 [JP] Japan ................. 61-93586

[51] Int. Cl.⁴ ............................. F16G 1/10
[52] U.S. Cl. ..................... 474/202; 474/205; 474/268
[58] Field of Search ............ 474/202, 205, 265–268; 428/258, 297

[56] References Cited

U.S. PATENT DOCUMENTS 4,604,081  8/1986  Mashimo et al. ............. 474/205
4,721,496  1/1988  Yokoyama et al. ........ 474/268 X

FOREIGN PATENT DOCUMENTS 59-22335  12/1984  Japan .
59-222639 12/1984  Japan .
61-96035   6/1986  Japan .

Primary Examiner—Thuy M. Bui
Attorney, Agent, or Firm—Birch, Stewart, Kolasch & Birch

[57] ABSTRACT

A toothed belt having a woven fabric adhesive-bonded to the surface thereof which is adapted to be brought into contact with pulley, wherein, out of the yarns forming the woven fabric, the yarns to be located in the longitudinal direction of the belt comprise crimped yarns obtained by subjecting to crimping nylon multifilament yarns having a relative viscosity of about 2.5 to sulphuric acid, a filament fineness of 2.5 d or under, and a filament strength of 7.5 g/d or over. This toothed belt is excellent in wear resistance on the surface thereof which is adapted to be brought into contact with pulleys and does not suffer from cracking.

2 Claims, 5 Drawing Sheets

TOOTHED BELT

FIELD OF THE INVENTION

The present invention relates to a toothed belt having a woven fabric adhesive-bonded to the surface thereof which is adapted to be brought into contact with pulleys.

BACKGROUND OF THE INVENTION

In recent years toothed belts have been used in the driving units of various kinds of machines. These toothed belts each have a woven fabric adhesive-bonded to the surface thereof which are adapted to be brought into contact with pulleys for the purpose of protecting the surface. The yarns forming the woven fabric, as for the yarns to be located in the longitudinal direction of the toothed belts, there have been used crimped yarns of synthetic fibers.

FIG. 1 shows a fragmentary perspective view of a toothed belt of the prior art. This toothed belt is constructed such that it comprises a rubber body 4 having tensile cords 3 embedded therein. The rubber body has teeth 6 formed on one surface thereof, and a woven fabric 2 adhesive-bonded to the surface 5 thereof adapted to be brought into contact with pulleys. As shown in FIG. 2, this toothed belt of the prior art is manufactured by locating a woven fabric 2, tensile cords 3 and unvulcanized rubber material 4 on a mold 1 having teeth or recessed and projecting portions on the surface thereof, and pressurizing and vulcanizing them so as to mold them. At that time, as shown in FIG. 3, the surface 5 of the rubber body which is to be brought into contact with pulleys is formed with teeth 6 along the recessed portions of the mold 1. The above-mentioned woven fabric 2 must meet requirements such that it must be elongated in the longitudinal direction of the belt along the teeth or recessed and projecting portions and is capable of elongating by several ten percents when it is subjected to low loading. Accordingly, as for the yarns in the woven fabric 2 extending in the longitudinal direction of the toothed belt, crimped yarns of synthetic fibres have so far been used so that they can be elongated appreciably from their crimped condition.

As for the above-mentioned crimped yarns of synthetic fibers in the woven fabric of the kind specified, there have so far been utilized nylon yarns for clothing. This nylon yarn for clothing has a relative viscosity of about 2.50 to sulphuric acid, a filament strength of 6 g/d and a filament fineness of about 3 deniers.

The reason for the use of the crimped yarns comprising nylon yarns for clothing is that in order to obtain strong adhesion between the woven fabric and the rubber material which forms the body portion of the toothed belt the nylon fibers are selected as the stock or raw material thereof, and only nylon yarns for clothing are generally available in the form of crimped yarns of nylon filaments. The nylon yarns for clothing are, however, inferior in wear resistance and heat resistance, and also the filament strength of such yarns after they have been subjected to crimping becomes as small as 5 g/d or under. Therefore the woven fabric formed by using such yarns has been incapable of protecting satisfactorily the surface of a toothed belt adapted to be brought into contact with pulleys, thus rendering it impossible to provide a satisfatory endurance to the toothed belt.

Furthermore, it should be noted that the inventor of the present invention has previously invented a method of subjecting nylon yarns for clothing for industrial materials, which are generally used for industrial application, to crimping, and filed a patent application with a Japanese Patent Application No. SHO 58-96358. (Refer to Japanese Patent Laid-open Publication No. SHO 59-223335.) The inventor of the present invention also found out that the crimped nylon yarns obtained by the above-mentioned method have a high strength and a sufficient shrinkage percentage, and they can be used satisfactorily to form a woven fabric to be adhesive-bonded to toothed belts. (Refer to Japanese Patent Laid-open Publication No. SHO 59-222639.)

The above-mentioned nylon yarns for industrial materials have a relative viscosity of 2.65 to 2.80 to sulphuric acid, a filament strength of 8 g/d, and a filament fineness of 5 to 10 deniers. By subjecting such nylon yarns to the crimping method of the above-mentioned invention, it is possible to obtain yarns whose filament strength after crimping is not less than 5 g/d and is higher than those of nylon yarns for clothing and whose shrinkage percentage is as high as 50% or over.

Further, in U.S. Pat. No. 4,604,081, there is disclosed a toothed belt formed by using woolly processed nylon yarns for industrial materials having an ultimate viscosity of 1.30 or over (and having a relative viscosity to sulphuric acid of 2.89 or over) for the yarns in the woven fabric to be located in the longitudinal direction of the belt.

The inventor of the present invention has made adhesive-bonding of a woven fabric formed by using crimped yarns obtained by crimping nylon yarns for industrial materials as mentioned above to the surface of a toothed belt adapted to be brought into contact with pulleys, and then carried out endurance tests on the belt. As a result, it was found out that in such a toothed belt the above-mentioned crimped yarns were cut off and cracks occurred in the root and bottom portions of the teeth and the portions in the vicinity thereof.

Since the cracks which occur in the root and bottom portions of the teeth of the belt are caused by the cut-off of the crimped yarns in the woven fabric adhesive-bonded to these portions, the inventor of the present invention utilized initially, aiming at an improvement of this respect, crimped yarns obtained by subjecting to crimping nylon yarns having a relative viscosity of 2.65 to 2.80 to sulphuric acid, a filament fineness of less than 5 d, and a filament strength of 5 g/d or over in terms of performance, for the yarns to be located longitudinally in a toothed belt so as to form a woven fabric, and provided a toothed belt having a woven fabric adhesive-bonded thereto. (Japanese Utility Model Laid-Open Publication No. SHO 61-96035).

However, since nylon yarns for industrial materials having a filament fineness of less than 5 deniers are not available in general, the nylon yarns as mentioned above need to be produced specially by melt spinning, and even when such nylon yarns were produced, it was difficult to subject them to stretching. Accordingly, difficulties arose in that yarns having a uniform filament fineness could not be obtained.

SUMMARY OF THE INVENTION

The present invention has for its object to provide a toothed belt which is capable of preventing the above-mentioned cracks and wear which tend to occur in toothed belts having a woven fabric formed by crimped nylon yarns adhesive-bonded to the surface thereof and adapted to be brought into contact with pulleys. A further object of the invention is to produce a toothed-belt having improved endurance.

According to the present invention, there is provided a toothed belt having a woven belt adhesive-bonded to the surface thereof which is adapted to be brought into contact with pulleys, characterized in that, out of the yarns for forming said woven fabric, the yarns to be located in the longitudinal direction of the belt comprise crimped yarns obtained by subjecting to crimping nylon yarns which have a relative viscosity of 2.5 to sulphuric acid, a filament fineness of 2.5 d or under, and a filament strength of 7.5 g/d or over.

DETAILED DESCRIPTION OF THE INVENTION

The present invention will now be described with reference to the accompanying drawings.

Figure 1:
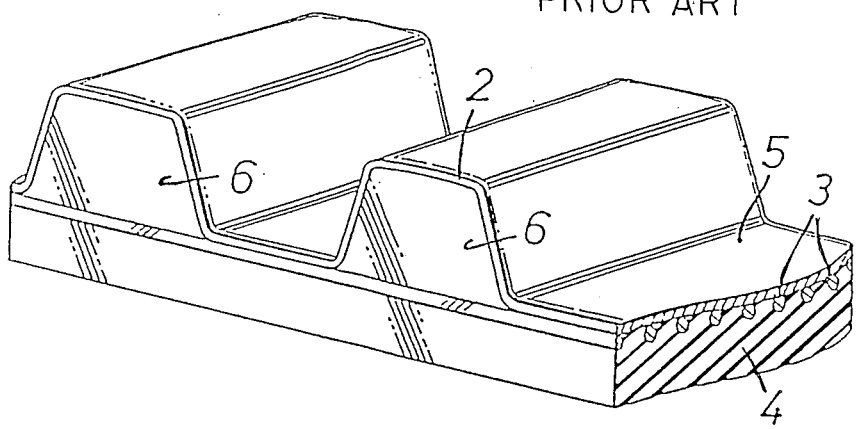
FIGS. 1-3 show a conventional tooth belt.
Figure 2:
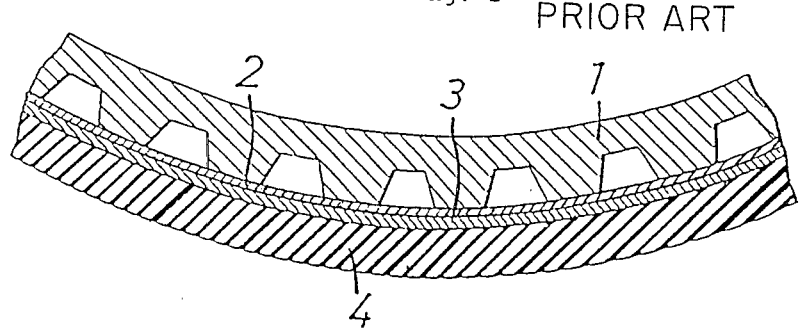
Figure 3:
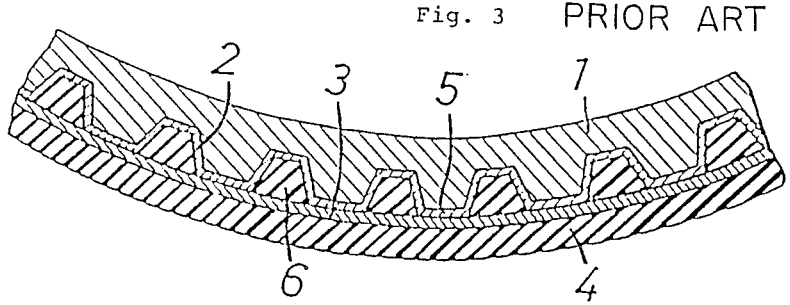
Figure 4:
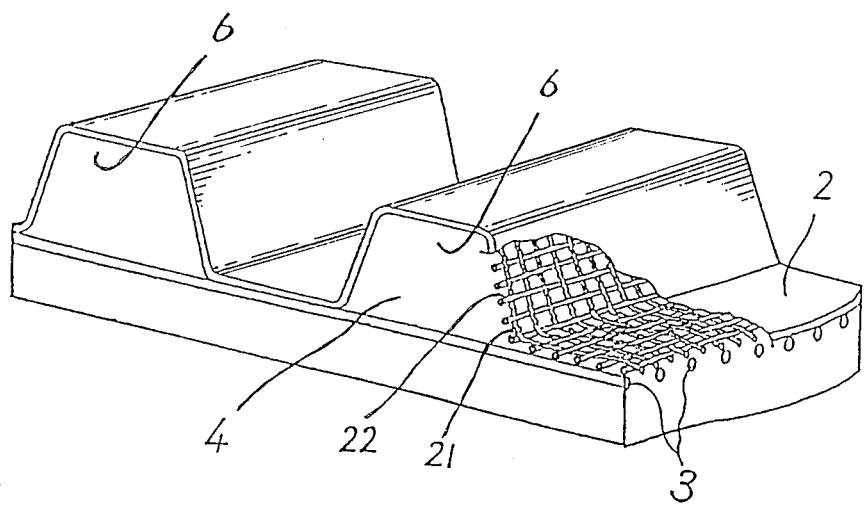
FIGS. 4-6 show a tooth belt of the present invention.

FIG. 4 is an explanatory view of a toothed belt of the present invention, which is a fragmentary perspective view of the toothed belt of the present invention. In FIG. 4, a woven fabric 2 is adhesive-bonded to a rubber body 4, and the body portion of the belt has teeth 6 formed on one surface thereof. This woven fabric 2 is made up by weaving yarns 21 to be located in the longitudinal direction of the toothed belt, and yarns 22 to be woven in combination therewith. The rubber body 4 has tensile cords 3 embedded therein.

The present invention is characterized in that the above-mentioned yarns 21 (refer to FIGS. 4, 5 and 6) comprise special crimped yarns obtained by subjecting nylon yarns to crimping. The yarns 21 are made of a polymer as the raw material thereof which is identical, before spinning, to the polymer used for the conventional nylon yarns for clothing and which has a relative viscosity of about 2.5 to sulphuric acid, a filament strength of 7.5 g/d or over, and a filament fineness of 2.5 deniers or under. Further, these nylon yarns are those which have a high strength obtained by fully drawing the conventional nylon yarns for clothing and which are used as sewing threads for general use in industrial sewing machines. The conditions for crimping these nylon yarns are as follows.

NUMBER OF FALSE TWIST (T)

$T \approx [275,000/(d+60)] + 800$ (times/m)

TEMPERATURE OF HEATER

The temperature of the heater should be slightly lower than that of the yarns to be processed.
In case of nylon 6: 160°-195° C.
In case of nylon 66: 200°-225° C.

KEEPING TIME IN HEATER (t)

$t = (0.7-0.8) \times \sqrt{(d/100)}$ (seconds)

(where d is the number of deniers of yarns to be processed or crimped)

Figure 5:
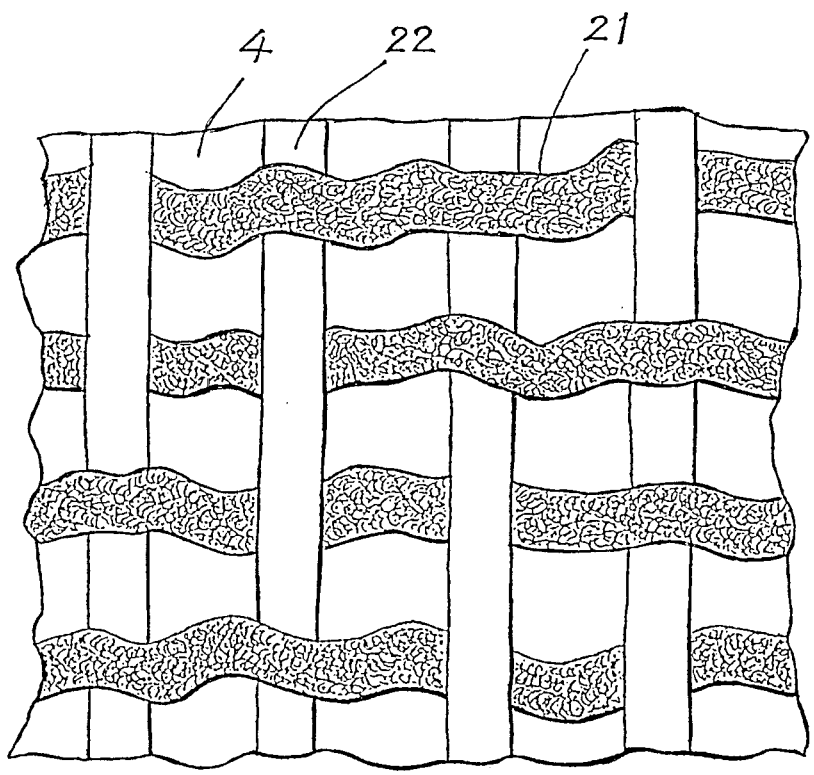
Figure 6:
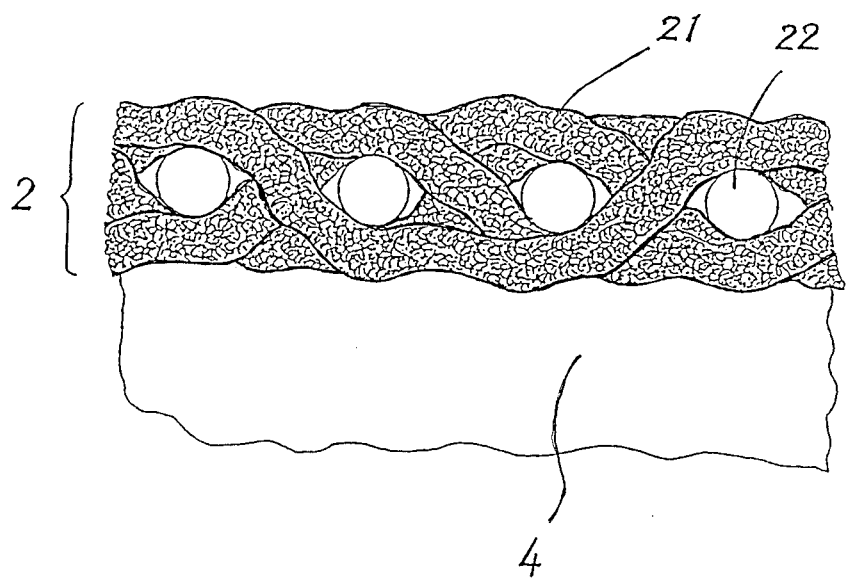

FIGS. 5 and 6 illustrate in a model form the manner in which the woven fabric 2 made up by the yarns 21 and 22 is adhesive-bonded to the rubber body 4.

The above-mentioned yarns in the woven fabric used in the toothed belt of the present invention have a relative viscosity of about 2.5 to sulphuric acid, and a filament fineness of 2.5 deniers or under. Therefore, even in case the quantity of the crimped yarns to be used in the woven fabric is increased, the strength of the woven fabric can be increased without any appreciable increase in the thickness thereof. Further, the surface of the belt adapted to be brought into contact with pulleys contains a great deal of filaments. As a result, the forces exerted on the surface of the belt with which pulleys are allowed to contact can be dispersed or distributed. Furthermore, the resultant increase in the surface area of the filaments will enhance the adhesion of the filaments to the rubber body 4. Moreover, since the filament fineness of the above-mentioned yarns 21 is small, the rubber material of the rubber body 4 can penetrate around each of the filaments by capillary action to protect them.

The above-mentioned woven fabric used in the present invention will now be described below by way of examples and comparative prior art examples.

The shrinkage percentage of the crimped yarns indicated in the following examples have the following definition.

As for the shrinkage percentage of crimped yarns, the crimp rigidity (CR value) of crimped yarns stipulated in JIS-L-1090 is generally used. However, this value is not adequate to define the performance of the woven fabric for use in toothed belts. Therefore, in this specification, "S", which is calculated by the following formula, shall be defined as the shrinkage percentage. This method of measuring the shrinkage percentage has been worked out by the inventor of the present invention.

In the first place, the crimped yarn wound in the shape of a cone or pirn is wound ten times so as to form a hank. After that, a pre-tension of 0.002 g/d is applied to the hank, and the original length ($L_1$) of the hank is measured. Then, the hank which is under the above-mentioned pre-tension applied condition is soaked in water maintained at a temperature of 20±2° C. for 3 minutes to shrink it, and then the pre-tension applied to the hank is released. Subsequently, it is subjected to air-drying for 12 to 24 hours. Thereafter, a loading of 0.002 g/d is applied again to the hank, and the length ($L_2$) of the hank after it has been shrinked is measured. Based on this measurement, the shrinkage percentage (S) is calculated by the following formula:

$$S = [(L_1 - L_2)/L_1] \times 100 \text{ (\%)}$$

EXAMPLE 1

A woven fabric is made by using the following yarns (1) and (2).

(1) Yarns to be located longitudinally in a toothed belt: four twist yarns of crimped yarns obtained by subjecting to crimping multi-filament yarns of NYLON 66 for sewing threads (multi-filament yarns having a relative viscosity of 2.50 to sulphuric acid, a filament fineness of 2.06 d, and a filament strength of 7.95 g/d; 70 d/34 f) (Performance of the crimped yarns: strength: 6.0 g/d, shrinkage percentage: 44.3%)

(2) Yarns to be woven in combination with Yarns (1): multi-filament yarns of NYLON 66 for industrial materials (multi-filament yarns having a relative viscosity of 2.70 to sulphuric acid and a filament fineness of about 6 d; 210 d/35 f)

Construction of the woven fabric
Picked number of yarns (1) = 85 lengths/inch,
Picked number of yarns (2) = 86 lengths/inch, Made up by 2/2 Twill Weave.

EXAMPLE 2

A woven fabric is made up by using the following yarns (1) and (2).

(1) Yarns to be located longitudinally in a toothed belt: six twist yarns of crimped yarns obtained by subjecting to crimping multi-filament yarns of NYLON 66 for sewing threads (multi-filament yarns having a relative viscosity of 2.50 to sulphuric acid, a filament fineness of 2.06 d, and a filament strength of 7.95 g/d; 70 d/34 f) (Performance of the crimped yarns: strength: 6.0 g/d, shrinkage percentage: 44.3%)

(2) Yarns to be woven in combination with yarns (1): same as those in EXAMPLE 1

Construction of the woven fabric: same as those in the above-mentioned EXAMPLE 1

COMPARATIVE EXAMPLE 1

A woven fabric is made up by using the following yarns (1) and (2).

(1) Yarns to be located longitudinally in a toothed belt: Double yarns of crimped yarns obtained by subjecting to crimping multi-filament yarns of NYLON 66 for industrial materials (multi-filament yarns having a relative viscosity of 2.70 to sulphuric acid, a filament fineness of about 3 d, and a filament strength of 6.5 g/d; 100 d/35 f) (Performance of the crimped yarns: strength: 6.0 g/d, shrinkage percentage: 60%)

(2) Yarns to be woven in combination with yarns (1): same as those in the EXAMPLE 1

Construction of the woven fabric:
Picked number of Yarns (1)=85 lengths/inch,
Picked number of Yarns (2)=85 lengths/inch,
Made up by 2/2 twill weave.

COMPARATIVE EXAMPLE 2

A woven fabric is made up by using the following yarns (1) and (2).

(1) Yarns to be located longitudinally in a toothed yarns: crimped yarns obtained by subjecting to crimping multi-filament yarns of NYLON 66 for industrial materials (multi-filament yarns having a relative viscosity of 2.70 to sulphuric acid, a filament fineness of about 6 d, and a filament strength of 8.12 g/d; 210 d/35 f) (Performance of the crimped yarns: strength: 6.0 g/d, shrinkage percentage: 54.3%)

(2) Yarns to be woven in combination with Yarns (1): multi-filament yarns of NYLON 66 for industrial materials (same as those in the above-mentioned EXAMPLE 1)

Construction of the woven fabric:
Picked number of Yarns (1)=85 lengths/inch,
Picked number of Yarns (2)=88 lengths/inch,
Made up by 2/2 twill weave.

COMPARATIVE EXAMPLE 3

A woven fabric is made up by using the following yarns (1) and (2).

(1) Yarns to be located longitudinally in a toothed belt: Double yarns of crimped yarns obtained by subjecting to crimping multi-filament yarns of NYLON 66 for clothing (Multi-filament yarns having a relative viscosity of 2.47 to sulphuric acid, a filament fineness of about 3 d, and a filament strength of 5.35 g/d; 100 d/34 f) (Performance of the crimped yarns: strength: 4.8 g/d, shrinkage percentage: 51.5%)

(2) Yarns to be woven in combination with yarns (1): multi-filament yarns of NYLON 66 for industrial materials (same as those in the above-mentioned EXAMPLE 1)

Construction of the woven fabric:
Picked number of Yarns (1)=85 lengths/inch,
Picked number of Yarns (2)=85 lengths/inch,
Made up by 2/2 twill weave The woven fabrics made up according to the above-mentioned examples and comparative examples were tested for the following test items and the results obtained are shown in TABLES 1 and 2.

TEST ITEMS

Tensile strength: The tensile strength of the yarns (1) in the woven fabric located in the longitudinal direction thereof (5 cm wide) was measured.

Elongation percentage under low loading: The elongation percentage of the yarns (1) in the woven fabric under the condition wherein a loading of 2 kg is applied to the longitudinal direction thereof (5 cm wide) was measured.

Figure 7:
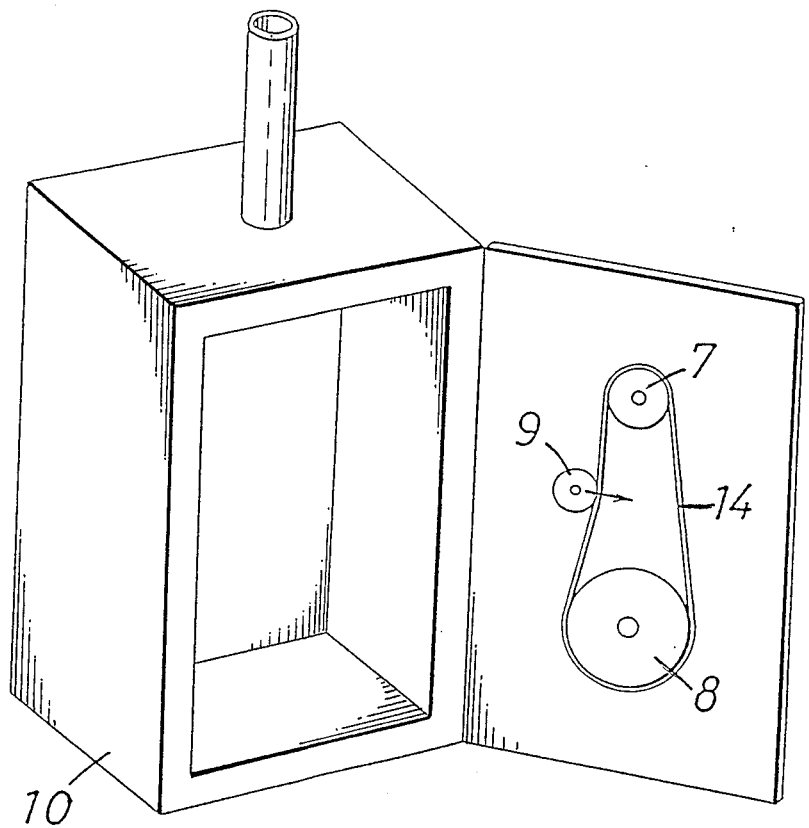
FIG. 7 shows a test machine.

Running Endurance test (accelerated aging test): The woven fabric was adhesive-bonded to the surface of a toothed belt having formed thereon teeth (pitch of teeth: 9.525 mm, the number of teeth: 92, width of tooth: 19.1 mm) which is adapted to be brought into contact with pulleys. After that, this belt was mounted on a test machine as shown in FIG. 7, and the test machine was run to observe the condition of the surface which was brought into contact with the pulleys and to measure the durable time of the toothed belt. The operation of the test machine was stopped when cracks occurred in this toothed belt or when abnormal wear was observed on it.

The test machine shown in FIG. 7 is constructed such that a drive pulley 7 having twenty teeth formed thereon and a driven pulley 8 having forty teeth formed thereon are located at a space interval of 285 mm; a toothed belt 14 is mounted around both the pulleys 7 and 8, and a constant tension is applied by means of an idler pulley 9 to the rear surface of the belt 14. The drive pulley 7 is arranged to be driven at 6,000 r.p.m. This test machine is accommodated in a box 10 and is arranged such that hot air can be applied into it to enable an accelerated aging test to be performed in a heated atmosphere at a temperature of 100° C.

TABLE 1

| | EXAMPLE 1 | EXAMPLE 2 | PRIOR ART EXAMPLE 1 | COMPARATIVE EXAMPLE 2 | COMPARATIVE EXAMPLE 3 |
|---|---|---|---|---|---|
| STRENGTH (kg/5 cm WIDE) | 280.0 | 400 | 212.0 | 215.0 | 155.0 |
| ELONGATION PERCENTAGE UNDER LOW LOADING (%) | 80 | 80 | 80 | 80 | 75 |

TABLE 1-continued

| | EXAMPLE 1 | EXAMPLE 2 | PRIOR ART EXAMPLE 1 | COMPARATIVE EXAMPLE 2 | COMPARATIVE EXAMPLE 3 |
|---|---|---|---|---|---|
| THICKNESS (mm) | 0.93 | 0.98 | 0.86 | 0.93 | 0.75 |
| QUANTITY OF YARNS (l) (d/25 mm WIDE) | 23,800 | 35,700 | 17,000 | 17,850 | 17,000 |

TABLE 2

| 100° C. ACCELERATED AGING TEST | MEASURED DURABLE TIME (HR) | | | | AVERAGE DURABLE TIME (HR) | CONDITION OF SURFACE OF BELT WHICH IS BROUGHT INTO CONTACT WITH PULLEYS |
|---|---|---|---|---|---|---|
| | 1 | 2 | 3 | 4 | | |
| EXAMPLE 1 | 1055 | 1160 | 1132 | 1078 | 1106 | MINOR CRACK WAS OBSERVED WITHOUT ANY WEAR |
| EXAMPLE 2 | 1640 | 1533 | 1582 | 1577 | 1583 | MINOR CRACK WAS OBSERVED WITHOUT ANY WEAR |
| COMPARATIVE EXAMPLE 1 | 955 | 947 | 963 | 939 | 951 | SLIGHT WEAR WAS OBSERVED AND CRACK OCCURRED |
| COMPARATIVE EXAMPLE 2 | 822 | 814 | 798 | 806 | 810 | NO SIGNIFICANT WEAR WAS FOUND, BUT CRACK OCCURRED |
| COMPARATIVE EXAMPLE 3 | 642 | 630 | 622 | 650 | 636 | REMARKABLE WEAR WAS OBSERVED |

According to the test results in TABLE 1, it can be seen that the woven fabric used in the toothed belt of the present invention has been improved remarkably in strength over the conventional woven fabrics. The woven fabric used in Example 1 is about 32% superior in strength to that in Comparative Example 1, about 30% superior to that in Comparative Example 2, and about 80% superior to that in Comparative Example 3. The woven fabric used in Example 2 is about 89% superior in strength to that in Comparative Example 1, about 86% superior to that in Comparative Example 2, and about 158% superior to that in Comparative Example 3. Since the above-mentioned yarns 1 used in the woven fabric to be adhesive-bonded to the toothed belt of the present invention have a relative viscosity of about 2.5 to sulphuric acid, and a filament fineness as small as 2.5 d or under, a great deal of yarns (1) can be used in the woven fabric without any appreciable increase in the thickness of the belt, and the strength of the teeth of the belt can be increased thereby. Thus, resultant toothed belt will have an excellent performance. For example, although the quantity of the yarns (1) used in the woven fabric in Example 2 is about two times that of the yarns in the woven fabric used in each of the Comparative Examples, nevertheless the elongation percentage of the woven fabric in the former example under low loading is nearly equal to that of the woven fabric in each of the latter examples. Therefore, the woven fabric used in Example 2 is able to elongate readily along the teeth of the toothed belt when the belt is molded. Therefore, it can be adhesive-bonded satisfactorily to the surface of the belt adapted to be brought into contact with pulleys.

Further, according to the test results shown in TABLE 2, it can be seen that the toothed belt obtained by the present invention has a remarkably high endurance. For example, the toothed belt having the woven fabric according to the Example 1 adhesive-bonded thereto can be enhanced in endurance by about 16% compared to the belt having the woven fabric according to Comparative Example 1 adhesive-bonded thereto, about 37% compared to the woven fabric according to Comparative Example 2 bonded thereto, and about 74% compared to the woven fabric according to Comparative Example 3 bonded thereto. The toothed belt having the woven fabric of the Example 2 adhesive-bonded thereto can be improved in endurance by about 66% compared to the belt having the woven fabric of Comparative Example 1 bonded thereto, about 96% compared to the woven fabric of Comparative Example 2 bonded thereto, and about 150% compared to the woven fabric of Comparative Example 3 bonded thereto.

This effect is derived from the fact that the yarns located in the longitudinal direction of the woven fabric used in the toothed belt according to the present invention have a relative viscosity of about 2.5 to sulphuric acid, and a filament fineness of 2.5 deniers or under. Therefore, the quantity of the filaments used in the woven fabric can be increased thereby increasing the surface area of the filaments on the surface of the belt which is adapted to be brought into contact with pulleys and improving the adhesion between the filaments and the rubber body. Moreover, the force to be carried by each of the filaments on the surface of the belt with which pulleys are brought into contact is reduced. The toothed belt according to the present invention does not suffer from wear on the surface thereof, and also sudden cracks and remarkable wear which tend to occur in the conventional toothed belts.

Thus, the toothed belt according to the present invention is high in the strength of the teeth and in wear resistance, and also can exhibit extremely excellent performance in terms of endurance so that it can be used in a stable condition for a long period of time.

What we claim is:

1. A toothed belt having a woven fabric adhesive-bonded to the surface thereof which is adapted to be brought into contact with pulleys and having yarns forming said woven fabric wherein the yarns located in the longitudinal direction of the belt comprise crimped yarns which are obtained by subjecting to crimping nylon multi-filament yarns which have a relative viscosity of about 2.5 to sulphuric acid, a filament fineness of 2.5 deniers or below, and a filament strength of 7.5 g/d or higher.

2. The toothed belt as set forth in claim 1, wherein said yarns to be located longitudinally of the toothed belt are crimped nylon yarns for sewing threads, and the quantity of said yarns is 20,000 d/25 mm (widthwise of the woven fabric) or higher.

* * * * *